United States Patent [19]

McEntire

[11] 4,444,971
[45] Apr. 24, 1984

[54] ACRYLIC AND METHACRYLIC QUATERNARY CHLOROMETHYL AMMONIUM CHLORIDE CATIONIC MONOMERS AND POLYMERS THEREOF

[75] Inventor: Edward E. McEntire, Austin, Tex.

[73] Assignee: Texaco Inc., White Plains, N.Y.

[21] Appl. No.: 517,165

[22] Filed: Jul. 25, 1983

[51] Int. Cl.³ ............... C08F 120/60; C08F 120/22; C08F 220/22; C07C 69/52
[52] U.S. Cl. ............... 526/292.2; 560/222; 564/204; 526/292.95
[58] Field of Search .............. 526/292.2, 292.95; 564/204; 560/222

[56] References Cited

U.S. PATENT DOCUMENTS

| | | | |
|---|---|---|---|
| 2,616,922 | 11/1952 | Ringwald et al. | 526/292.2 |
| 2,980,657 | 4/1961 | Melamed | 526/204 |
| 3,467,614 | 9/1969 | Dinges et al. | 526/292.2 |
| 3,694,393 | 9/1972 | Lewis et al. | 560/222 |

FOREIGN PATENT DOCUMENTS 742722 9/1966 Canada ....................... 564/204

2351297 4/1975 Fed. Rep. of Germany ...... 564/204

*Primary Examiner*—Joseph L. Schofer
*Assistant Examiner*—Peter F. Kulkosky
*Attorney, Agent, or Firm*—Jack H. Park; Kenneth R. Priem

[57] ABSTRACT

The present invention is directed to a new class of cationic monomers and to polymers thereof. The monomers are quaternary chloromethyl ammonium chlorides having the following general formula:

$$CH_2=CR_1COX(CH_2)_nN^{\oplus}R_3R_4CH_2Cl \quad Cl^{\ominus} \qquad (1)$$

where
$R_1 = H, CH_3$
$X = O, NR_2$ where $R_2 = H$, lower alkyl
$n = 2-6$
$R_3, R_4 =$ independently lower alkyl The present invention is also directed to homopolymers and copolymers of the above described class of monomers.

13 Claims, No Drawings

ACRYLIC AND METHACRYLIC QUATERNARY CHLOROMETHYL AMMONIUM CHLORIDE CATIONIC MONOMERS AND POLYMERS THEREOF

BACKGROUND OF THE INVENTION

1. Technical Field of the Invention

This invention relates to novel acrylic and methacrylic quaternary chloromethyl ammonium chlorides and to homopolymers and copolymers thereof.

The polymers of the present invention contain pendant quaternary ammonium groups. These polymers are useful in solving liquid/solid separation problems related to water pollution, paper manufacturing, textile finishing, etc. The new class of monomers finds particular use as flocculants for water clarification. They can also be used to break the emulsions formed by the production of tar sands with steam.

2. Description of the Prior Art

Although acrylic and methacrylic quaternary ammonium chlorides have heretofore been produced such as, for example, methacrylamidopropyltrimethylammonium chloride, insofar as is known, there has heretofore been no provision of acrylic and methacrylic monomers containing chloromethyl groups attached to the quaternized nitrogen atom.

SUMMARY OF INVENTION

In one aspect the present invention is directed to novel acrylic and methacrylic quaternary chloromethyl ammonium chlorides of the general formula:

$$CH_2=CR_1COX(CH_2)_nN^{\oplus}R_3R_4CH_2Cl \quad Cl^{\ominus} \quad (1)$$

where
$R_1 = H, CH_3$
$X = O, NR_2$ where $R_2 = H$, lower alkyl
$n = 2-6$
$R_3, R_4 =$ independently lower alkyl In another aspect, the present invention is directed to the manufacture of the novel acrylic and methacrylic monomers by the reaction of methylene chloride with a starting material having the formula:

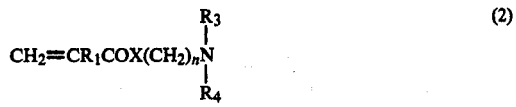

$$CH_2=CR_1COX(CH_2)_n\overset{R_3}{\underset{R_4}{N}} \quad (2)$$

where
$R_1 = H$ or $CH_3$
$X = O$ or $NR_2$
$R_2 = H$ or $C_1-C_4$ alkyl
$n = 2-6$
$R_3, R_4 =$ independently, $C_1-C_4$ alkyl The reaction between the monomer and the methylene chloride proceeds noncatalytically in an inert atmosphere at moderate temperatures such as temperatures in the range of about 20° to about 100° C.

Yet another aspect of the present invention is the preparation of a homopolymer or a copolymer of the novel monomers of the present invention. The polymers can be formed by known solution, suspension or emulsion type acrylic polymerization reactions of the type known to those skilled in the art. Among the comonomers that may be used in the preparation of copolymers are monomers such as n-alkyl esters, secondary and branched-chain alkyl esters, esters of olefinic alcohols, aminoalkyl esters, esters of ether alcohols, cycloalkyl esters, esters halogenated alcohols, etc. Representative comonomers include methyl acrylate, ethyl acrylate, propyl acrylate, butyl acrylate, hexyl acrylate, heptyl acrylate, octyl acrylate, dodecyl acrylate, hexadecyl acrylate, isopropyl acrylate, isobutyl acrylate, sec-butyl acrylate, 2-ethylhexylacrylate, alkyl acrylate, 2-(dimethylamino)ethyl acrylate, 2-(diethylamino)ethyl acrylate, 2-(dibutylamino)ethyl acrylate, 2-methoxyethyl acrylate, 2-ethoxyethyl acrylate, cyclohexyl acrylate, 2-bromoethyl acrylate, 2-chloroethyl acrylate, etc. and the corresponding methacrylates.

Other vinyl monomers may be used such as N-substituted acrylamides, acrylamide, N,N-dimethylacrylamide, N-vinyl pyrrolydone, acrylic acid, methacrylic acid, styrene, α-methyl styrene, acrylonitrile, methacrylonitrile, etc. that are known monomers for the preparation of acrylic and methacrylic ester copolymers.

One or more than one comonomer may be used in mixed, random, alternating, block and graft copolymers, as desired. Thus, the polymers may be prepared by first polymerizing the amine-containing monomer to yield a homopolymer or a copolymer. These polymers may then be reacted with methylene chloride to provide the desired polymers containing pendant chloromethyl ammonium groups. Thus, one skilled in the art may, at his election, choose the reaction sequences he prefers in preparing the polymers of the present invention.

The polymers of the present invention are characterized by good water solubility properties and are useful, therefore, in treating paper and textiles and in the preparation of coatings, ion exchange resins, etc.

DESCRIPTION OF THE PREFERRED EMBODIMENTS

The novel monomers of the present invention are prepared from compounds of formula (2) given above, which react noncatalytically with methylene chloride at temperatures of about 20° to about 100° C. A temperature of about 50° C. has been found to be particularly suitable. It is preferable to conduct the reaction under an inert atmosphere, but this is not essential.

The reaction can be conducted for example, by dissolving the monomeric raw material in methylene chloride in an appropriate reaction vessel, blanketing the reaction vessel with an inert atmosphere and then heating the reaction vessel to a desired temperature for a period of time adequate for at least partial reaction of the methylene chloride with the tertiary amine group on the amine containing monomer.

The time required for completion of the reaction will vary with the reactivity of the amine and the reaction temperature that is used.

At the end of the reaction period, excess methylene chloride may be evaporated or removed by any other appropriate means known to those skilled in the art to provide a mixture of a major amount of the desired novel monomer of the present invention with a minor amount of unreacted feed monomer. The resultant mixture may be further purified by solvent extraction. The residual amine may be recycled to provide additional quaternary compounds if desired.

As another alternative method of purification, the reaction mixture, at the end of the reaction, may be progressively treated with methylene chloride under aqueous alkaline conditions to extract unreacted feed monomer. When substantially all of the unreacted feed monomer has been extracted, the novel monomer may be recovered from the resultant methylene chloride solution by evaporation of the water and methylene chloride or by any other appropriate technique.

In accordance with another aspect of the present invention the novel monomers of the present invention are utilized to prepare homopolymers and copolymers.

The polymerization may be conducted in any desired manner known to those skilled in the art such as solution polymerization, suspension polymerization or emulsion polymerization utilizing known polymerization catalysts such as azo catalysts, organic peroxides and redox polymerization catalysts such as sulfite-persulfate systems, etc.

Preparation of Novel Monomers

EXAMPLE 1

About 5 grams of N-(3-dimethylaminopropyl)methacrylamide were dissolved in about 20 grams of methylene chloride. The solution was sealed in a vapor tight bottle and heated at a temperature of about 50° C. for 72 hours. At the end of that time, on cooling, phase separation occurred and the upper phase was removed. The residue was analyzed by proton nuclear magnetic resonance spectroscopy in solution in a mixture of deuterated and dimethyl sulfoxide. The sample was found to contain the chloromethyl derivative of the starting monomer, the starting monomer and methylene chloride in the mol ratios of about 1 to about 0.15 to about 3.8. The proton nuclear magnetic resonance spectrum of the chloromethyl quaternary derivative showed bands as follows:

TABLE I

| ppm from TMS* | Multiplicity | Assignment |
|---|---|---|
| 8.25 | Triplet | NH |
| 5.87 | Multiplet | Z Vinyl CH |
| 5.30 | Multiplet | E Vinyl CH |
| 5.70 | Singlet | $ClCH_2N^{\oplus}$ |
| 3.70 | Multiplet | $CH_2CH_2N^{\oplus}$ |
| 3.37 | Singlet | $CH_3N^{\oplus}$ |
| 3.30 | Multiplet | $CONHCH_2$ |
| 2.12 | Multiplet | $CH_2CH_2CH_2$ |
| 1.95 | Multiplet | $CCH_3$ |

*Tetramethylsilane

Based upon the above identified information it was concluded that the compound that has been prepared was a compound having the following formula:

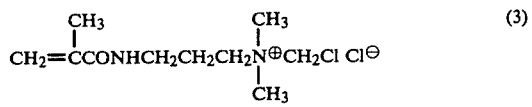

A $C_{13}$ NMR spectrum was also obtained and confirmed the formula given above.

EXAMPLE 2

Two grams of 2-(dimethylamino)ethyl methacrylate and 10 grams of methylene chloride were combined in a vapor tight bottle and heated for about 60 hours at 50° C. Analysis of the residue showed that about 58% of the monomer had reacted. A nuclear magnetic resonance spectrum was obtained by analyzing a sample of the product in solution in deuterated trichloromethane. The bands from the analysis are set forth in Table II.

TABLE II

| ppm from TMS | Multiplicity | Assignment |
|---|---|---|
| 6.15 | Multiplet | Z Vinyl CH |
| 5.70 | Multiplet | E Vinyl CH |
| 6.03 | Singlet | $ClCH_2N^{\oplus}$ |
| 4.70 | Multiplet | $OCH_2CH_2N^{\oplus}$ |
| 4.29 | Multiplet | $OCH_2CH_2N^{\oplus}$ |
| 3.68 | Singlet | $CH_3N^{\oplus}$ |
| 1.94 | Multiplet | $CH_3C$ |

The structure assigned the novel monomer was as follows:

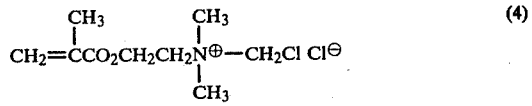

EXAMPLE 3

A glass container was filed with 18.56 grams of N-(3-dimethylaminopropyl)acrylamide and 96.35 grams of methylene chloride. The bottle was sealed and heated for about 36 hours at 50° C. The upper viscous layer was extracted with additional methylene chloride. The residue that remained after evaporating the product in a vacuum to remove methylene chloride was analyzed by infrared analysis and shown to be an unsaturated secondary amide. Proton and carbon-13 nuclear magnetic resonance spectra were consistent with the formation of a product having the formula:

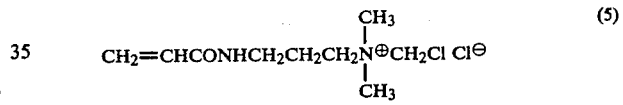

The residue was also analyzed for ionic chloride by ion chromatography and for total chloride by ion chromatography by an ion chromatography combustion technique. The ionic chloride content was about 13% and total chloride was about 26% of the sample weight. The sample was found to contain about 10.88% nitrogen by Kjeldahl analysis.

EXAMPLE 4

A mixture of 3 grams of dimethylaminopropyl methacrylamide about 6 grams of methylene chloride and about 2 grams of methanol were combined in a sealed reactor and heated for about 36 hours at about 50° C. The solvent was then evaporated to give about 4.57 grams of a product which was identified as a 6 to 1 mol ratio mixture of the desired chloromethylquaternary derivative of the feed monomer and of the feed monomer itself. This was determined by nuclear magnetic resonance spectroscopy analysis. When the methanol was replaced with about 1.2 grams of water, a two phase mixture resulted after heating as above. The upper aqueous layer contained the desired chloromethylquaternary compound of the present invention and unreacted feed monomer in the mol ratio of about 13 to 1.

EXAMPLE 5

About 300 grams of dimethylaminopropylmethacrylamide, 300 grams of methylene chloride and 381 grams of water were sealed in a reactor and heated at 50° C. for about 50 hours. At the end of that time a 215 gram portion of the aqueous layer was adjusted to a pH of 10% sodium hydroxide and extracted with four 100 ml portions of methylene chloride. The purity of the chloromethyl quaternary compound of the present invention increased as unreacted monomer was removed. Initial purity was about 94.1% but after the fourth extraction, purity had reached the level of about 97.4%. Residual methylene chloride was removed by vacuum evaporation at about 40° C.

Polymer Formation

EXAMPLE 6

To a resin kettle equipped with a magnetic stirrer, a thermometer, gas inlet and outlet ports were charged:
  100 grams of the aqueous solution of Example 5 (69.7% solids)
  132 grams deionized water The pH of the solution was adjusted to about 5.5 with 10% phosphoric acid. Then about 0.25 grams of 2,2'-Azobis (2-amidinopropane)hydrochloride were added. The solution was degassed by vacuum evacuation and then blanketing with nitrogen. The reaction vessel was maintained at a temperature of about 50° C. After about 5 hours, a viscous liquid resulted having a viscosity of about 4660 centistokes at 25° C. The conversion of monomer to polymer was about 75% as shown by nuclear magnetic spectroscopic analysis of the polymer in solution in deuterium oxide. Molecular weight was estimated at 740,000 by liquid chromatographic analysis using polyethylene oxide standards. Viscosity of a 0.5% solution of the product in water was 5.56 centistokes at 25° C.

Polymer Utilization

EXAMPLE 7

A suspension of about 0.2 weight percent of colloidal kaolin powder in water was treated in a vessel with an aqueous solution of the polymer of Example 6 in a concentration of about 0.0037% polymer. 25 cc samples of the kaolin suspension in test tubes were treated at the various concentrations. The results of this series of tests is given in the following table:

TABLE III

| Amount Polymer Solution Added | ppm Polymer Added to 25 cc | Observations |
|---|---|---|
| 0.26 g | 0.4 | No change |
| 1.06 g | 1.6 | Floc observed after 45 sec., remaining liquid above floc somewhat turbid |
| 2.0 g | 3.0 | Immediate floc, remaining liquid nearly clear |

As will be seen from Table III, the polymer of the present invention is effective for the removal of suspended clay from water by flocculation.

The foregoing examples are given by way of illustration only and are not intended as limitations on the scope of the present invention which is defined by the appended claims.

What is claimed is:

1. A compound having the formula:

$$CH_2=CR_1COX(CH_2)_nN^{\oplus}R_3R_4CH_2Cl \quad Cl^{\ominus} \quad (1)$$ 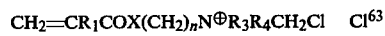

where
R$_1$=H, CH$_3$
X=O, NR$_2$ where R$_2$=H, lower alkyl
n=2-6
R$_3$, R$_4$=independently are C$_1$-C$_4$ alkyl 2. A compound as in claim 1 of the formula:

$$\underset{CH_3}{\overset{CH_3}{|}}\overset{CH_3}{\underset{|}{|}} \atop CH_2=CCONHCH_2CH_2CH_2N^{\oplus}CH_2Cl \ Cl^{\ominus} \atop \underset{CH_3}{|} \quad (3)$$ 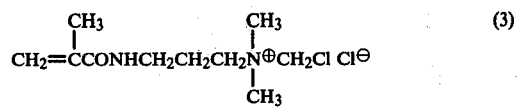

wherein in the formula of claim 1 R$_1$ is methyl, X is nitrogen, R$_2$ is hydrogen, n is 3 and R$_3$ and R$_4$ independently are methyl.

3. A compound as in claim 1 of the formula:

$$\underset{CH_3}{\overset{CH_3}{|}}\overset{CH_3}{\underset{|}{|}} \atop CH_2=CCO_2CH_2CH_2N^{\oplus}-CH_2Cl \ Cl^{\ominus} \atop \underset{CH_3}{|} \quad (4)$$ 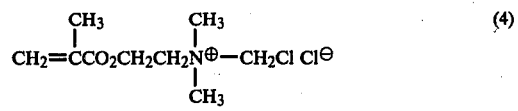

wherein in the formula of claim 1 R$_1$=methyl, X=oxygen, n=2, R$_3$ and R$_4$ independently are methyl.

4. The compound as in claim 1 of the formula:

$$\overset{CH_3}{\underset{|}{|}} \atop CH_2=CHCONHCH_2CH_2CH_2N^{\oplus}CH_2Cl \ Cl^{\ominus} \atop \underset{CH_3}{|} \quad (5)$$ 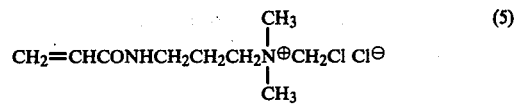

wherein in the formula of claim 1 R$_1$=hydrogen, X=nitrogen, R$_2$=hydrogen and R$_3$ and R$_4$ independently are methyl.

5. A method of preparing a novel compound having the formula:

$$CH_2=CR_1COX(CH_2)_nN^{\oplus}R_3R_4CH_2Cl \quad Cl^{\ominus} \quad (1)$$ 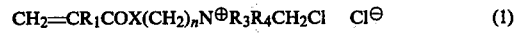

where
R$_1$=H, CH$_3$
X=O, NR$_2$ where R$_2$=H, lower alkyl
n=2-6
R$_3$, R$_4$=independently are C$_1$ to C$_4$ alkyl
which comprises noncatalytically reacting methylene chloride with a feed compound having the formula:

$$\overset{R_3}{\underset{|}{|}} \atop CH_2=CR_1COX(CH_2)_nN \atop \underset{R_4}{|} \quad (2)$$ 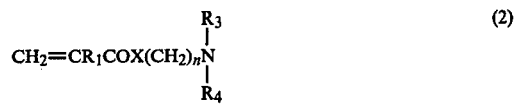

where
R$_1$=H or CH$_3$
X=O or NR$_2$
R$_2$=H or C$_1$-C$_4$ alkyl
n=2-6
R$_3$, R$_4$=independently, C$_1$-C$_4$ alkyl 6. A method as in claim 5 wherein, the feed compound has the formula:

$$\overset{R_3}{\underset{|}{|}} \atop CH_2=CR_1COX(CH_2)_nN \atop \underset{R_4}{|} \quad (2)$$ 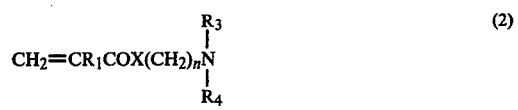

wherein $R_1$=methyl, X=N, $R_2$=H, n=3, $R_3$ and $R_4$ independently equal methyl, and the novel compound has the formula:

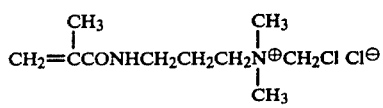 (3)

7. A method as in claim 5 wherein, the feed compound has the formula:

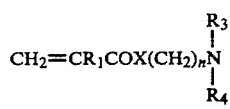 (2)

wherein $R_1$=methyl, X=O, n=2, $R_3$ and $R_4$ independently equal methyl in the above formulae, and the novel compound has the formula:

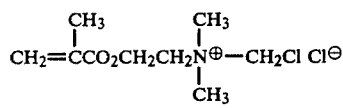 (4)

8. A method as in claim 5 wherein, the feed compound has the formula:

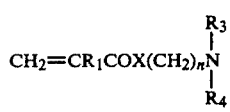 (2)

wherein $R_1$=H, X=N, $R_2$=H, $R_3$ and $R_4$ independently equal methyl, and the novel compound has the formula:

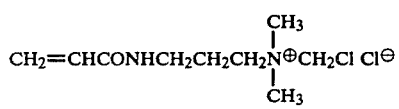 (5)

9. A polymer of a compound having the formula:

 (1)

where
$R_1$=H, $CH_3$
X=O, $NR_2$ where $R_2$=H, lower alkyl
n=2-6
$R_3$, $R_4$=independently $C_1$ to $C_4$ alkyl 10. A polymer as in claim 9 of a monomer of the formula:

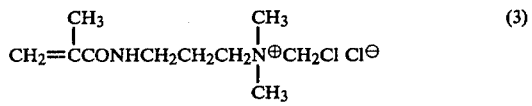 (3)

wherein in the formula of claim 9 $R_1$=$CH_3$, X=N, $R_2$=H, n=3, and $R_3$ and $R_4$ independently equal methyl.

11. A polymer as in claim 9 of a monomer of the formula:

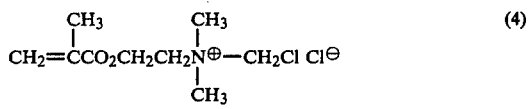 (4)

wherein in the formula of claim 9 $R_1$=methyl, X=oxygen, n=2, $R_3$ and $R_4$ independently equal methyl.

12. A polymer as in claim 9 of a monomer of the formula:

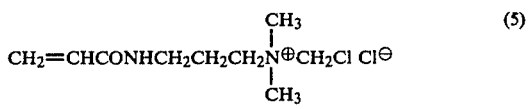 (5)

wherein in the formula of claim 9 $R_1$=H, X=N, $R_2$=hydrogen, n=3, $R_3$ and $R_4$ independently equal methyl.

13. Polychloromethyldimethylmethacrylamidoammonium chloride.

* * * * *